(12) United States Patent
Martinez

(10) Patent No.: US 10,708,109 B2
(45) Date of Patent: Jul. 7, 2020

(54) OFDM RECEIVER

(71) Applicant: NXP B.V., Eindhoven (NL)

(72) Inventor: Vincent Martinez, Roques (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/401,121

(22) Filed: May 2, 2019

(65) Prior Publication Data

US 2019/0349238 A1    Nov. 14, 2019

(30) Foreign Application Priority Data

May 10, 2018    (EP) .................................. 18305578

(51) Int. Cl.
*H04L 27/28*    (2006.01)
*H04L 27/26*    (2006.01)
*H04L 5/00*    (2006.01)

(52) U.S. Cl.
CPC ........ *H04L 27/2659* (2013.01); *H04L 5/0044* (2013.01); *H04L 27/2656* (2013.01); *H04L 27/2675* (2013.01)

(58) Field of Classification Search
CPC ............. H04L 27/2659; H04L 27/2675; H04L 27/2656; H04L 5/0044
USPC ...................................................... 375/260
See application file for complete search history.

(56) References Cited

U.S. PATENT DOCUMENTS

| 7,280,564 | B1 * | 10/2007 | Geile ................. | H03M 13/356 370/507 |
| 2005/0152326 | A1 * | 7/2005 | Vijayan ............... | H04L 27/2656 370/343 |
| 2015/0030108 | A1 * | 1/2015 | Chae .................. | H04L 27/2659 375/344 |

FOREIGN PATENT DOCUMENTS

EP    2744162 A1    6/2014

OTHER PUBLICATIONS

Matlab ltePSBCH, "Physical sidelink broadcast channel", https://uk.mathworks.com/help/lte/ref/ltepsbch.html, downloaded Jun. 18, 2018.

(Continued)

*Primary Examiner* — Don N Vo

(57) ABSTRACT

A system for use with an OFDM-receiver. The system comprising a frequency-offset-correction-block; and a sub-band-demapping-block. The sub-band-demapping-block is configured to receive an input-signal and determine within the input signal: one or more allocated-frequency-sub-bands allocated to convey an information-signal; and one or more unallocated-frequency-sub-bands. The sub-band-demapping-block can then provide the allocated-frequency-sub-bands and the unallocated-frequency-sub-bands to the frequency-offset-correction-block. The frequency-offset-correction-block is configured to: receive a frequency-offset-estimation-signal representative of a frequency-offset-error of the input-signal relative to a local oscillator of the OFDM-receiver; and apply a frequency-correction-algorithm to the allocated-frequency-sub-bands and at least a subset of the unallocated-frequency-sub-bands, based on the frequency-offset-estimation-signal, to produce a frequency-corrected-signal which compensates for the frequency-offset-error of the input-signal.

20 Claims, 12 Drawing Sheets

(56) References Cited

OTHER PUBLICATIONS

Shang, Z., "A Novel Frequency Synchronization Method for Wireless OFDM Systems", IEEE 2004.
Wang, J., "BLER Performance Evaluation of LTE Device-to-Device Communications", NISTIR 8157, National Institute of Standards and Technology, U.S. Department of Commerce, Nov. 2016.

* cited by examiner

Frequency Offset results in loss of orthogonality between subcarriers

Figure 9
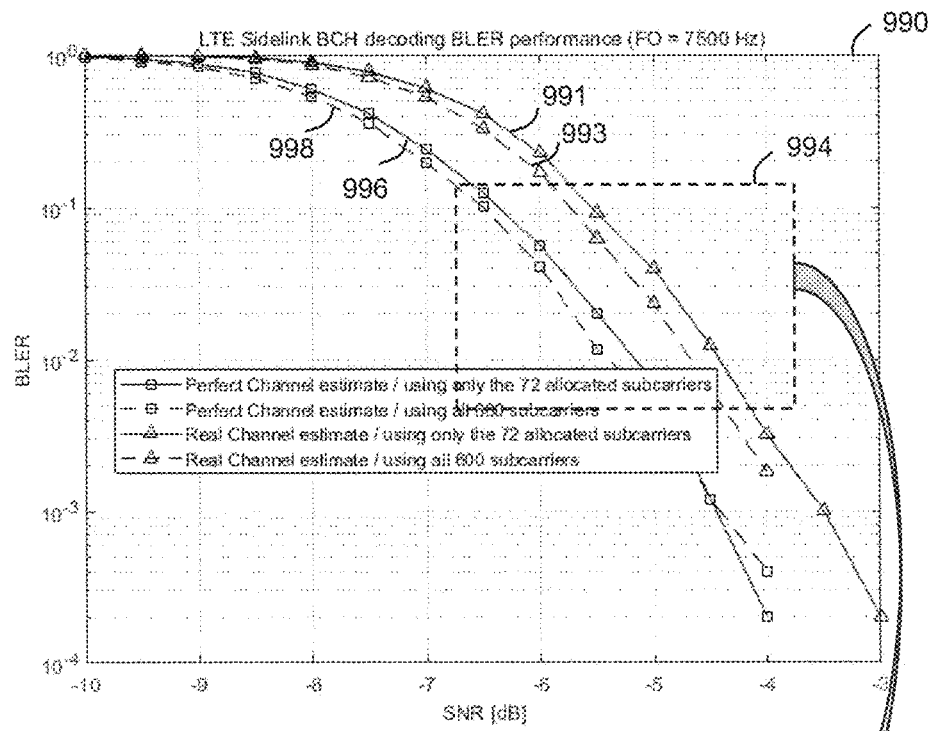
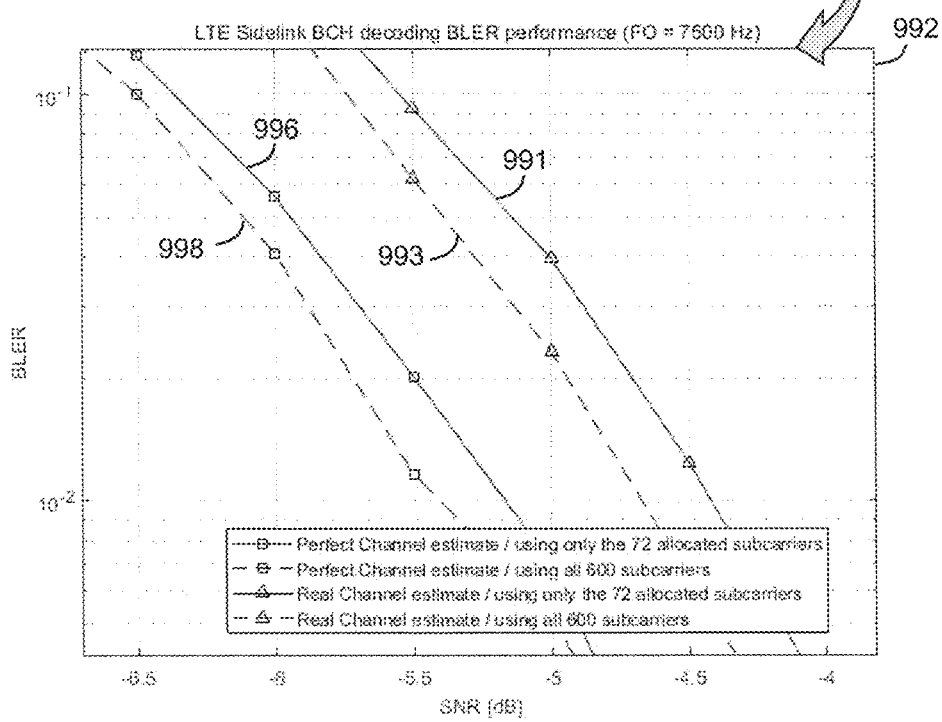

OFDM RECEIVER

CROSS-REFERENCE TO RELATED APPLICATIONS

This application claims the priority under 35 U.S.C. § 119 of European Patent application no. 18305578.9, filed on 10 May 2018, the contents of which are incorporated by reference herein.

The present disclosure relates to an orthogonal frequency division multiplexing (OFDM) receiver, and more particularly to frequency offset correction in an OFDM receiver.

According to a first aspect of the present disclosure there is provided a system for use with an OFDM-receiver, the system comprising:
  a frequency-offset-correction-block; and
  a sub-band-demapping-block configured to:
    receive an input-signal and determine within the input signal:
      one or more allocated-frequency-sub-bands allocated to convey an information-signal; and
      one or more unallocated-frequency-sub-bands; and
    provide the allocated-frequency-sub-bands and the unallocated-frequency-sub-bands to the frequency-offset-correction-block;
  wherein the frequency-offset-correction-block is configured to:
    receive a frequency-offset-estimation-signal representative of a frequency-offset-error of the input-signal relative to a local oscillator of the OFDM-receiver; and
    apply a frequency-correction-algorithm to the allocated-frequency-sub-bands and at least a subset of the unallocated-frequency-sub-bands, based on the frequency-offset-estimation-signal, to produce a frequency-corrected-signal which compensates for the frequency-offset-error of the input-signal.

In one or more embodiments the sub-band-demapping-block may be further configured to provide the allocated-frequency-sub-bands to a frequency-offset-estimation-block. The frequency-offset-estimation-block may be configured to determine the frequency-offset-estimation-signal based on the allocated-frequency-sub-bands.

In one or more embodiments the sub-band-demapping-block may be configured to determine a frequency-sub-band in the input-signal as either an allocated-frequency-sub-band or an unallocated-frequency-sub-band based on a communications standard.

In one or more embodiments the allocated-frequency-sub-bands may be allocated to convey data subframes or synchronization subframes.

In one or more embodiments the allocated-frequency-sub-bands can comprise a range of frequency-sub-bands positioned in the centre of a total frequency bandwidth available.

In one or more embodiments the frequency-offset-correction-block may be further configured to remove the unallocated-frequency-sub-bands before providing the frequency-corrected-signal.

In one or more embodiments the frequency-offset-correction-block may be configured to produce the frequency-corrected-signal using all subcarriers of the input-signal.

In one or more embodiments the sub-band-demapping-block is configured to: generate an extended-subcarrier-signal based on the input signal, wherein the extended-subcarrier-signal comprises, for one or more predetermined symbols within a sub-frame of the input signal: (i) the one or more allocated-frequency-sub-bands; and (ii) the one or more unallocated-frequency-sub-bands; and provide the extended-subcarrier-signal to the frequency-offset-correction-block. The frequency-offset-correction-block may be configured to: apply the frequency-correction-algorithm to the extended-subcarrier-signal based on the frequency-offset-estimation-signal.

In one or more embodiments the frequency-offset-correction-block can comprise a finite impulse response filter configured to perform frequency-offset-correction on the input signal.

In one or more embodiments the frequency-offset-correction-block can comprise one or more of:
  a frequency-to-time-domain conversion block configured to convert the allocated-frequency-sub-bands and unallocated-frequency-sub-bands to a time-domain-uncorrected-signal;
  a phase-ramp-generator configured to generate a phase-ramp-signal based on the frequency-offset-estimation-signal;
  a phase-ramp-multiplier configured to receive the phase-ramp-signal and the time-domain-uncorrected-signal and multiplies the two signals to produce a ramped-time-domain-signal; and
  a time-to-frequency-domain conversion block to convert the ramped-time-domain-signal to the frequency-corrected-signal.

In one or more embodiments the system can comprise a second frequency-offset-correction-block configured to operate in the same manner as the frequency-offset-correction-block. The frequency-offset-block may be configured for use in a channel-estimate-block and the second frequency-offset-block may be configured for use in a decoding-block.

In one or more embodiments the system can be used with any of:
  a LTE OFDM receiver;
  a LTE SC-FDMA receiver,
  a LTE-V2X SC-FDMA receiver
  a 5G OFDM receiver;
  a 5G SC-FDMA receiver; or
  any other OFDM, OFDMA or SC-FDMA receiver.

In one or more embodiments the OFDM receiver may be a LTE OFDM or LTE SC-FDMA receiver. The 72 central frequency-sub-bands can be allocated-frequency-sub-bands allocated to convey a synchronization subframe.

According to a further aspect of the invention, there is provided a receiver comprising any system disclosed herein.

In one or more embodiments the receiver can comprise a plurality of systems, wherein each system is associated with a respective antenna.

According to a further aspect of the invention there is provided a method for producing a frequency-corrected-signal for a OFDM-receiver comprising the steps of:
  receiving an input-signal and determining within the input signal:
    one or more allocated-frequency-sub-bands allocated to convey an information-signal; and
    one or more unallocated-frequency-sub-bands;
  receiving a frequency-offset-estimation-signal representative of a frequency-offset-error of the input-signal relative to a local oscillator of the OFDM-receiver;
  applying a frequency-correction-algorithm to the allocated-frequency-sub-bands and at least a subset of the unallocated-frequency-sub-bands, based on the frequency-offset-estimation-signal, to produce the frequency-corrected-signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 2:
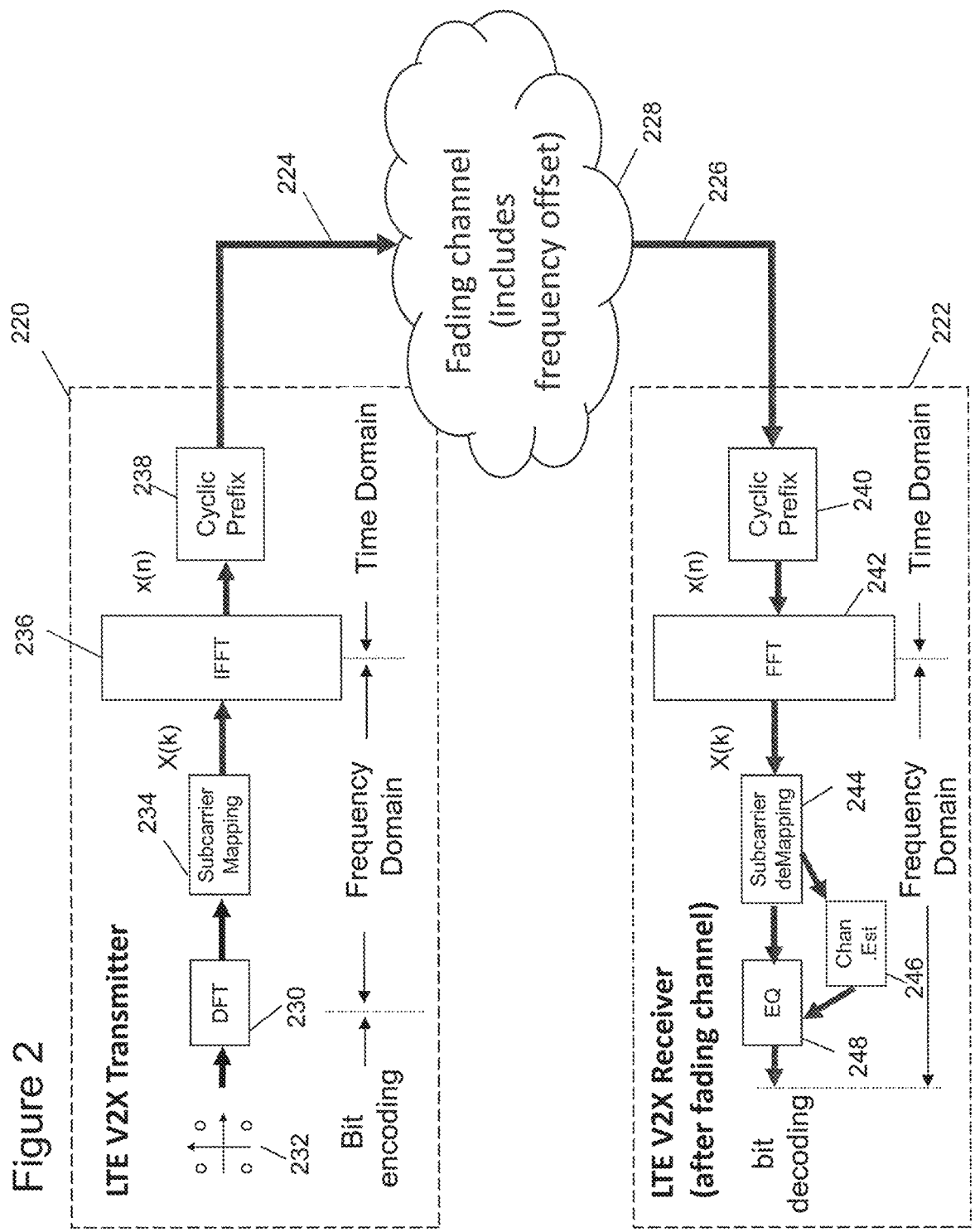
FIG. 2 illustrates an example schematic of communication from a LTE-V2X Transmitter to a LTE-V2X Receiver.
Figure 5:
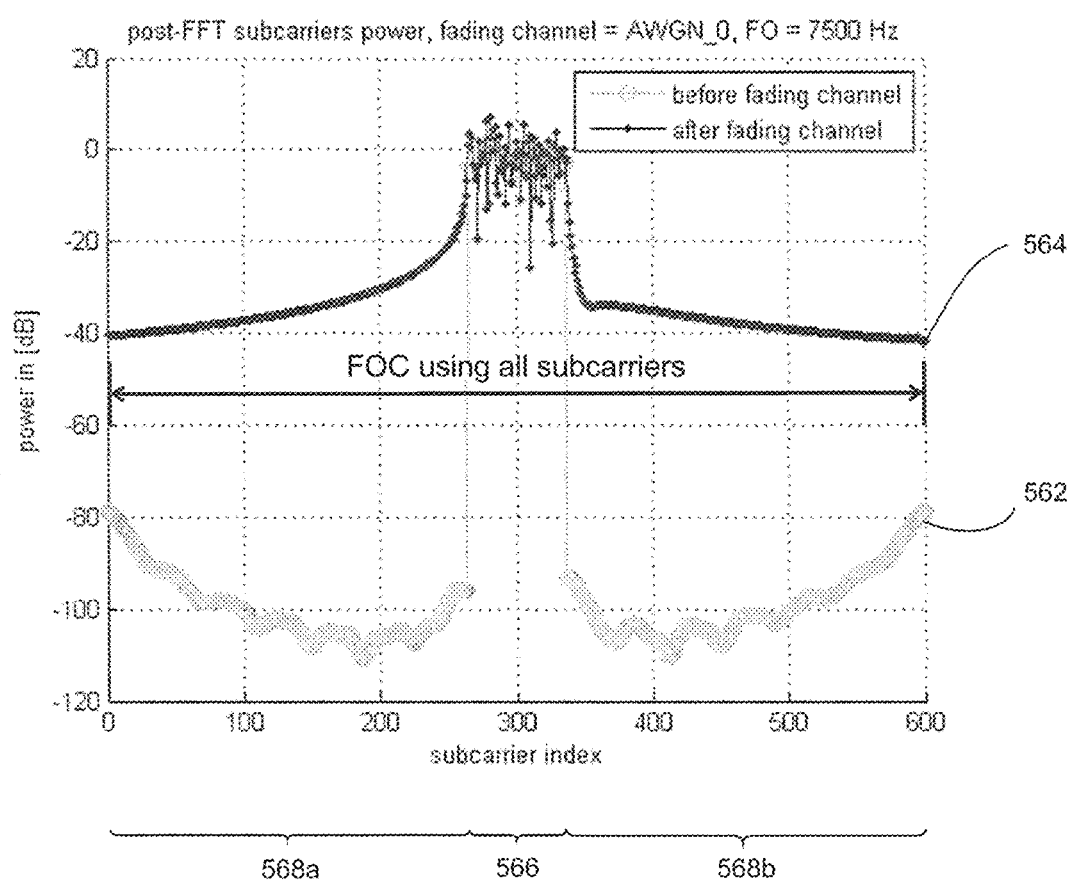
Figure 6:
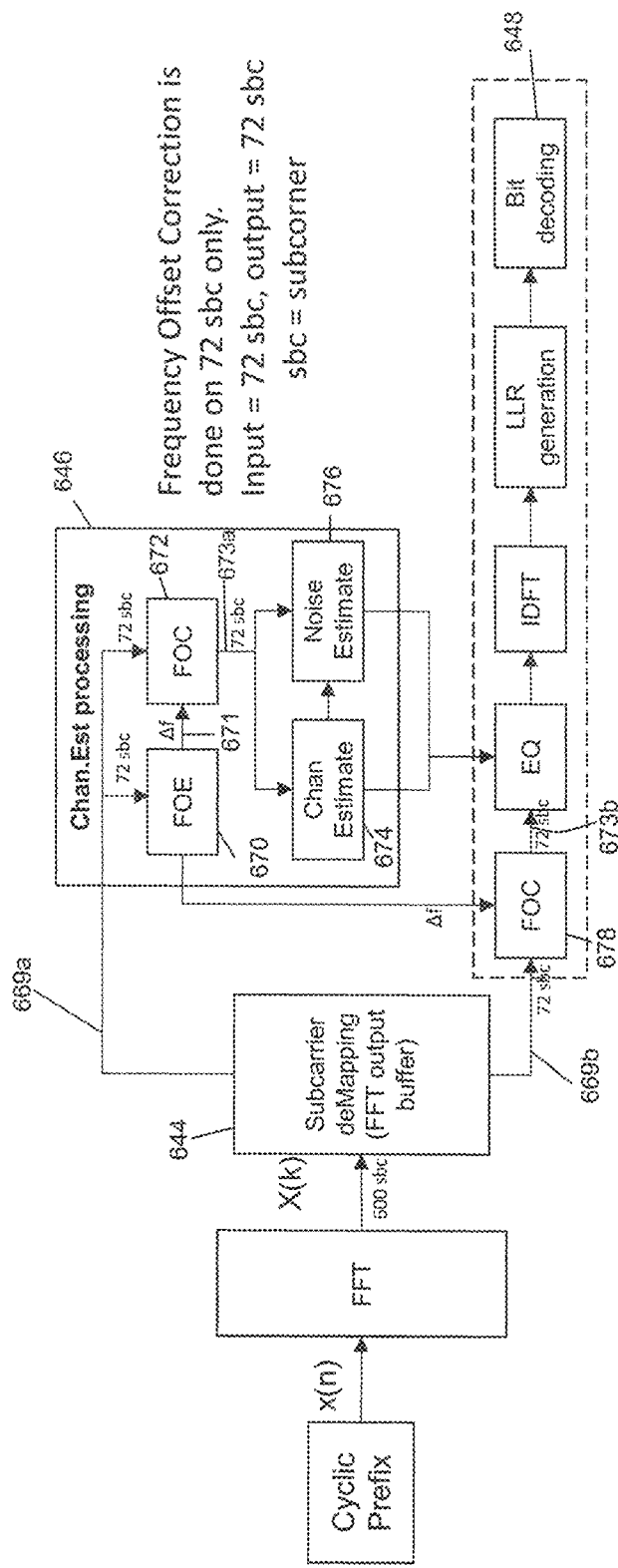
Figure 7:
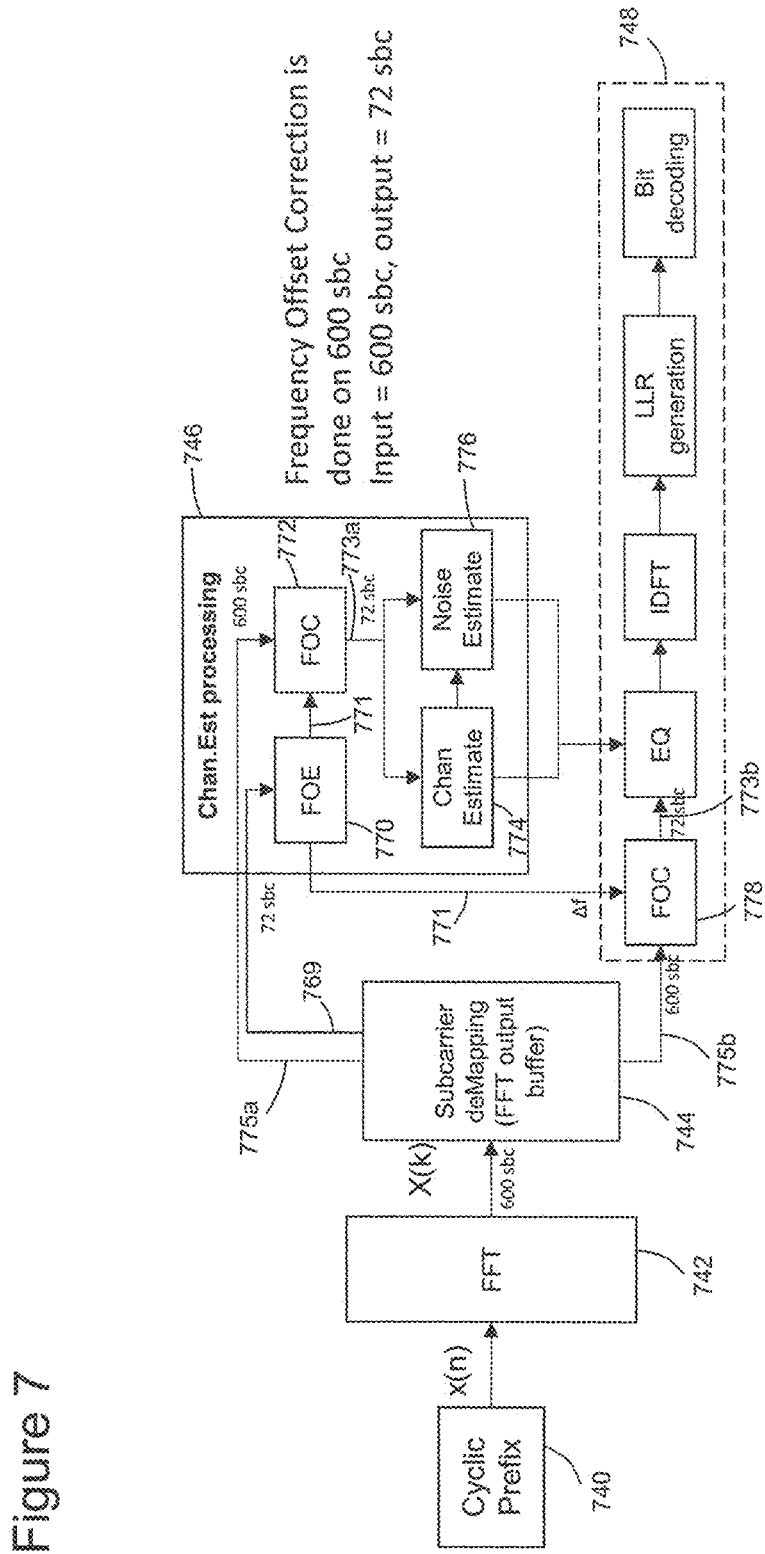
Figure 8:
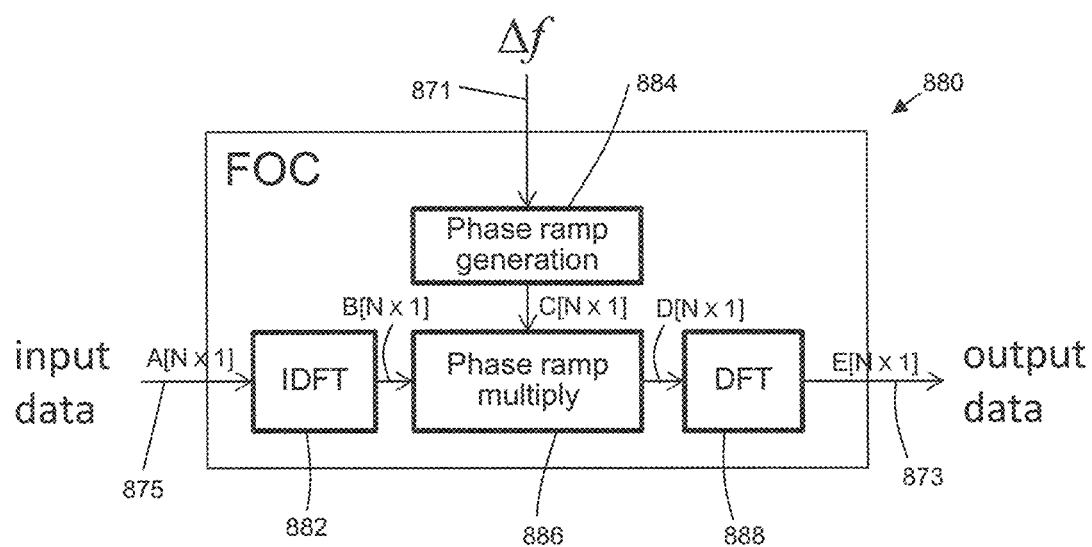
Figure 10:
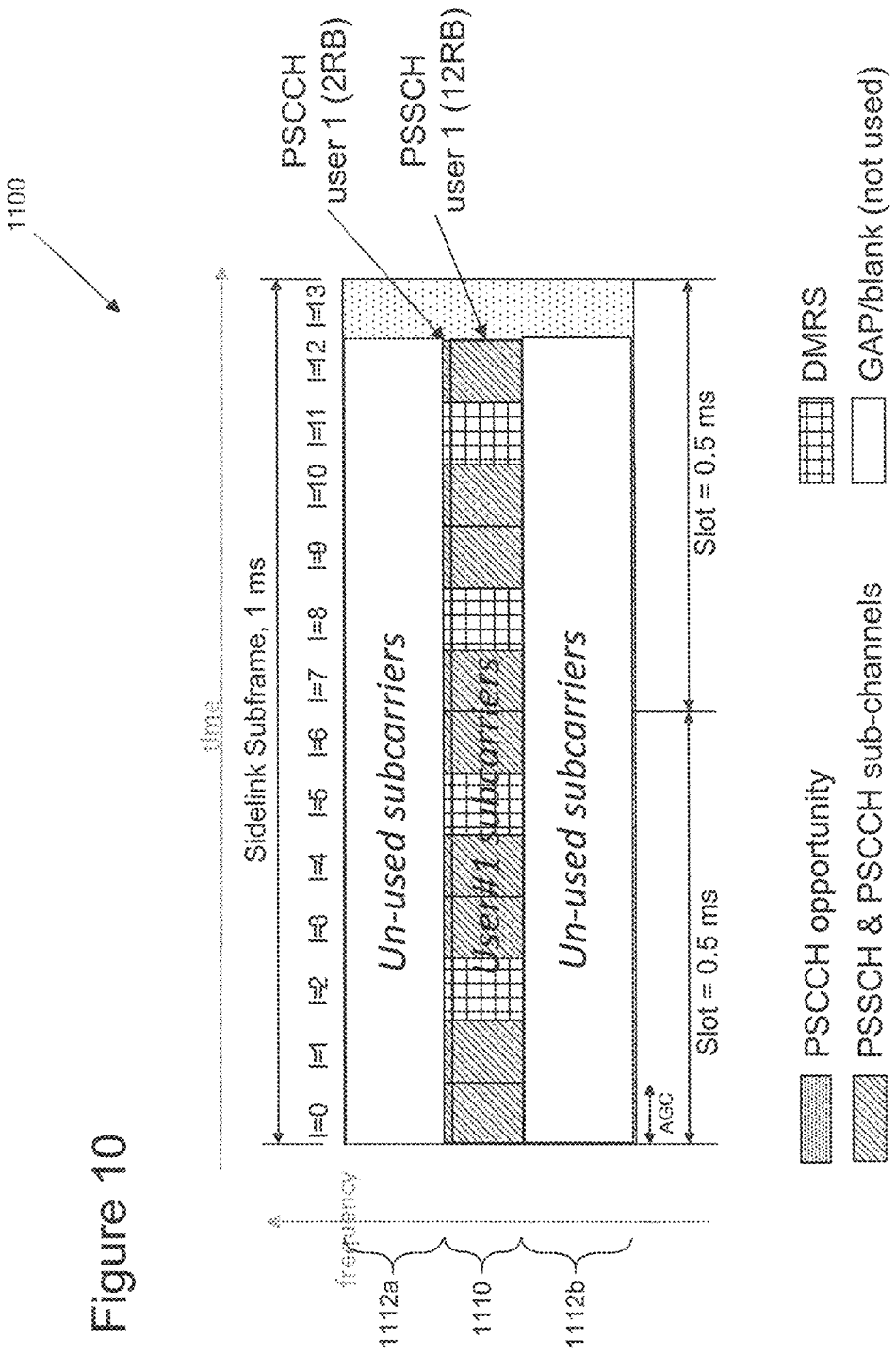

FIGS. 4*a* to 4*f* illustrate the leakage of energy to unallocated-subcarriers for varying levels of frequency-offset-error:

FIG. 5 illustrates the concept of performing frequency-offset-correction using both unallocated-subcarriers and allocated-subcarriers;

FIG. 6 illustrates a more detailed schematic of a OFDM receiver similar to that of FIG. 2;

FIG. 7 illustrates a schematic of a receiver configured to perform frequency-offset-correction using both unallocated-subcarriers and allocated-subcarriers;

FIG. 8 illustrates a frequency-offset-correction-block suitable for use with the receivers of FIGS. 2, 6 and 7;

FIG. 9 illustrates the performance improvement obtained from the receiver of FIG. 7 relative to the receiver of FIG. 6 for a frequency offset error of 7.5 kHz;

FIG. 10 illustrates an example LTE Sidelink data-subframe in which only a single user is utilising the available bandwidth.

Communication networks such as LTE Sidelink can be organized with different topologies. One type of organization, such as LTE Sidelink "mode 3", has master base-stations that dynamically allocate frequency sub-bands and time subframes to all of the users in order to reduce/minimize collisions. All user-nodes communicate with the master-node via up-link and down-link to receive their scheduling grant information. The master-node can also instruct users about a reference clock via synchronization subframes.

In another type of organization, there are no base-stations and the users can autonomously and co-operatively select their resources, without a master-node, according to Decentralized Congestion Control (DCC) schemes. Long Term Evolution Vehicle to Everything (LTE-V2X) "mode 4" is an example of a co-operative configuration. LTE-V2X is part of the Intelligent Transport Systems (ITS) system. In such networks, the common clock for Sidelink users is generally extracted from a Global Navigation Satellite System (GNSS) signal. Additionally, Sidelink users can periodically send synchronization subframes such that surrounding users who are not able to receive GNSS signals can still get a reference clock.

Examples disclosed herein relate to the 3GPP Sidelink Rel-14 and Rel-15 standards, specifically "mode 3" and "mode 4" which are designed for V2X applications, and their implementation in a mobile device (for example a car, motorbike, bicycle, pedestrian handset or road-side unit). However, the examples are not limited to LTE-V2X and may apply to other Orthogonal Frequency Division Multiplexing (OFDM) standards such as 5G. As used herein, OFDM can refer to the family of OFDM waveforms. That is OFDM may refer to OFDM (IEEE 802.11p for example), orthogonal frequency-division-multiple-access (OFDMA) (LTE downlink for example), or single-carrier frequency-division-multiple-access (SC-FDMA) (LTE Uplink or LTE Sidelink for example).

Examples disclosed herein may relate to the decoding of Physical Sidelink Broadcast Channel (PSBCH or BCH), although can also apply to the Physical Sidelink Shared Channel (PSSCH) and Physical Sidelink Control channel (PSCCH).

In LTE-V2X, there are two types of subframes:
1. "Data subframes" that convey user data payloads, via PSCCH and PSSCH LTE channels. The PSCCH and PSSCH can comprise demodulation reference signal (DMRS) symbols. The purpose of DMRS is to provide a channel estimation pilot for demodulating the PSCCH or PSSCH. A data payload for a car may comprise speed, location, heading and/or traffic information for example; and
2. "Synchronization subframes" that convey the PSS, SSS (Primary & Secondary Synchronization Signal), DMRS and BCH.
   a. The purpose of the PSS and SSS is to indicate the frame timing, for frequency & time synchronization of the V2X users.
   b. The purpose of DMRS is to provide a channel estimation pilot for demodulating BCH.
   c. The BCH carries information about the carrier parameters, such as:
      i. System bandwidth (1.4, 3, 5, 10, 15 or 20 MHz);
      ii. Frequency Division Duplex (FDD) or Time Division Duplex (TDD) mode;
      iii. For TDD mode, additional details like subframe configuration and special subframe organization;
      iv. Frame and sub-frame numbers of the BCH, PSS and SSS transmission period; and
      v. A Boolean flag indicating whether the user equipment (UE) is within or outside base-station coverage.

Figure 1:
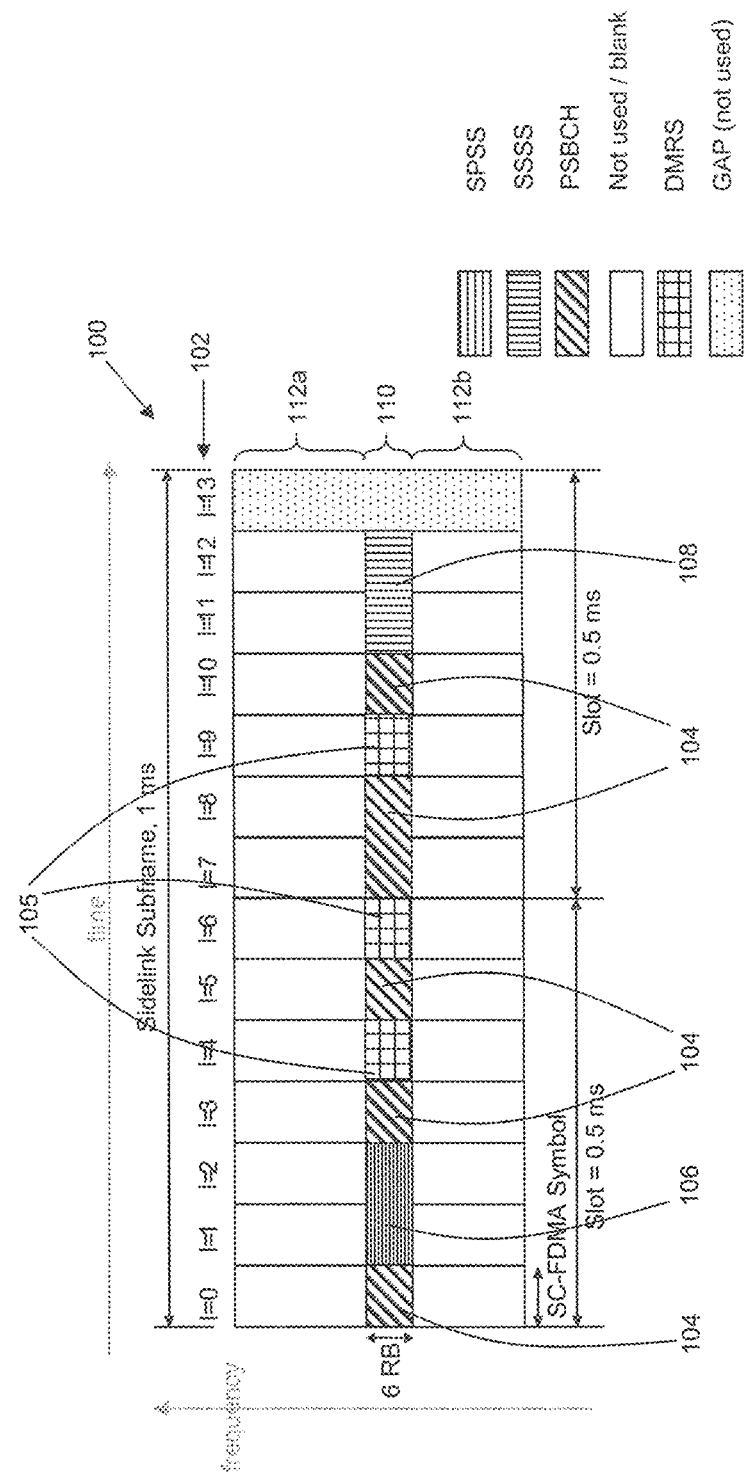
FIG. 1 shows an example LTE Sidelink V2X synchronization subframe.

FIG. 1 illustrates an example LTE synchronization subframe 100, with a carrier bandwidth of 10 MHz. The synchronization subframe occupies 1 subframe. The LTE subframe lasts 1 ms and is divided into 14 OFDM symbols 102. As used herein, OFDM symbols may relate to OFDM, OFDMA or SC-FDMA symbols. In this example, BCH 104 is carried on symbols 1, 4, 6, 8, 9 and 11; DMRS 105 is carried on symbols 5, 7 and 10; PSS 106 is carried on symbols 2 and 3; and SSS 108 is carried on symbols 12 and 13.

The synchronization subframes 100 are transmitted periodically. Such periodicity can be configured by the network (if V2X is operated in transmission "mode 3"); V2X users may also rely on an existing pre-configuration in modes 3 and 4. The periodicity may be defined by a standard, such as 3GPP TS 36.211 or 3GPP TS 36.213.

It can be seen from FIG. 1 that the BCH 104, DMRS 105, PSS 106 and SSS 108 channels are allocated to a range of frequency subcarriers positioned in the centre of the total frequency bandwidth available. Frequency subcarriers, or subcarriers, are an example of frequency-sub-bands. In this example, the synchronization subframes (BCH 104, DMRS 105, PSS 106 and SSS 108 channels) are allocated to the central 72 subcarriers or equivalently the central 6 resource blocks (RB). The central 72 subcarriers can be termed allocated-subcarriers 110 in that they have been allocated to convey information, in this example the synchronization signalling. In the example of FIG. 1, the total bandwidth is 10 MHz, typical for V2X carriers and corresponding to 600 subcarriers. The remaining 528 subcarriers are un-allocated or un-used/blank and can be termed unallocated-subcarriers 112. Allocated subcarriers and unallocated subcarriers are examples of allocated-frequency-sub-bands and unallocated-frequency-sub-bands respectively.

The allocation of the synchronization channels to the allocated-subcarriers occurs at a OFDM transmitter according to standard specification, for example LTE specification. In LTE-V2X, the synchronization subframes carry the BCH, DMRS, PSS & SSS signals. These subframes use only the middle 6 RB of the spectrum (~1 MHz wide). All the other subcarriers of the 10 MHz carrier/bandwidth are kept blank/un-used, they are unallocated-subcarriers (at least during transmission of the synchronization subframes).

The allocation of only the centre subcarriers of the total spectral bandwidth available may appear inefficient in this 10 MHz channel example, but it can provide commonality, given that LTE carriers (bandwidth) can be as small as 1.4 MHz (LTE carrier possible total spectral bandwidth: 1.4, 3, 5, 10, 15, 20 MHz). 1.4 MHz corresponds to 72 subcarriers. Different geographical regions can use different LTE bandwidths as standard. Limiting the synchronisation channels of the synchronization subframe to the 72 central subcarriers enables LTE receivers to operate universally for all possible LTE communication bandwidths. This flexibility in bandwidth size is originating from LTE Uplink and LTE Downlink carrier requirements, however, LTE Sidelink V2X typically employs a 10 MHz bandwidth, so the synchronization subframe 100 for LTE-V2X comprises 72 allocated-subcarriers 110 and 528 unallocated-subcarriers 112. These numbers can vary depending on the OFDM communication standard used.

The synchronization procedure enables users to be aligned in time, frequency, and on a list of other parameters, for example carrier bandwidth or FDD/TDD mode. Users should understand and use the resource medium in the same way to reduce interference, for example inter-symbol-interference (ISI) or inter-carrier-interference (ICI). Sidelink networks are synchronous networks, so Individual users should be synchronized before any data-payloads can be exchanged. Individual user-nodes may use their own Global Positioning Satellite (GPS) signal; a Global Navigation Satellite System (GNSS) signal and/or a base-station signal to synchronize to the global network and obtain an accurate local oscillator. User to user synchronization may then occur and the user-node with the most recent global clock synchronization may act as a temporary timing/synchronization authority.

FIG. 2 illustrates an example schematic of communication from a LTE-V2X Transmitter 220 to a LTE-V2X Receiver 222. The transmitter 220 outputs a transmission-signal 224 which is received as a receive-signal 226 by the receiver via a fading channel 228. As discussed further below, the fading channel 228 can result in a frequency-offset such that the receive-signal 228 is offset in frequency from the transmission-signal 224.

The transmitter comprises a discrete-Fourier-transform (DFT) block 230 that can transform a time domain signal-to-be-transmitted 232 into the frequency domain. A subcarrier-mapping-block 234 allocates the frequency domain signal-to-be-transmitted to one or more subcarriers. For example, if the signal-to-be-transmitted is a synchronisation subframe, the subcarrier-mapping-block 234 can allocate the signal-to-be-transmitted to the central 72 subcarriers. Any remaining un-used subcarriers in the available bandwidth will be unallocated-subcarriers.

The allocation of the synchronization-subframe to the central-subcarriers occurs according to standard specification, for example LTE specification. Allocation of data-subframes also occurs according to standard specification, but is not limited to the central subcarriers. Allocation of data-subframes can be determined according to protocol, such as decentralized congestion control (DCC).

The subcarrier-mapping-block 234 outputs a plurality of subcarriers X(k) to an inverse-fast-Fourier-transform block 236 to produce the time-domain transmission-signal 224. A cyclic-prefix-block 238 includes a cyclic-prefix (CP) in the transmission-signal 224.

The receiver comprises a cyclic-prefix-receiving-block 240 and a fast-Fourier-transform (FFT) block 242 to handle the cyclic-prefix of the receive-signal 226 and transform the receive-signal 226 back into the frequency domain respectively. A subcarrier-demapping-block 244 receives a frequency domain input-signal from the FFT block 242 and determines the allocated-subcarriers and the unallocated-subcarriers. The subcarrier-mapping-block 234 and the sub-carrier-demapping-block 244 are examples of a sub-band-mapping-block and a sub-band-demapping-block respectively.

If the subcarrier-demapping-block 244 receives a synchronisation subframe, it will isolate the 72 central allocated-subcarriers and provide them to a channel-estimate-block 246 and a decoding-block 248. The unallocated-subcarriers are not processed any further. In this way, the receiver 222 uses the central 72 subcarriers for the decoding process of PSS/SSS, DMRS and BCH. As will be discussed further below, the channel-estimate-block 246 can estimate and correct a frequency-offset-error of the input-signal relative to a local oscillator of the OFDM-receiver (not shown).

A frequency offset error between a receive-signal received by a receiver and a local oscillator of the receiver can result from:
  Transmitter or receiver local oscillator (LO) inaccuracies;
  A timing mismatch or other discrepancy between the transmitter LO and the receiver LO;
  Misalignment of the transmitter or receiver LOs to a common reference timing; and
  A Doppler frequency shift due to a relative velocity difference between the transmitter 220 and receiver 222.

The Doppler frequency shift $f_D$ is proportional to the carrier frequency $f_c$ and the relative speed v:

$$f_D = \frac{vf_c}{c}\cos(\alpha)$$

where c is the speed of light and $v\cos(\alpha)$ is the relative velocity between the transmitter 220 and the receiver 222. The 3rd Generation Partnership Project (3GPP) sets a velocity specification of 250 km/h for LTE-V2X Rel-14. For an example LTE-V2X application in the 5.9 GHz Intelligent Transportation Systems (ITS) band and two users travelling in opposite directions, each at 250 km/h, the Doppler frequency shift will be 2.7 kHz.

The 3GPP conformance test specifications also include a +/−600 Hz margin for possible transmitter/receiver local oscillator clock misalignment, in conformance testing procedures. Adding this to the Doppler frequency shift could result in a maximum frequency offset of 3.3 kHz:

$$f_{D,max} = \frac{vf_c}{c}\cos(\alpha) + 600 = 3.3 \text{ kHz}$$

Frequency offset errors between the transmitting and receiving user, or between the receive-signal 226 and the receiver LO, can result in the loss of subcarrier orthogonality. This can translate into some energy in a subcarrier leaking to adjacent subcarriers. This can result in energy leaking from an allocated subcarrier to an unallocated subcarrier. This sensitivity of OFDM-based systems to frequency offset is more significant in the case of LTE compared to IEEE 802.11p, due to the finer subcarrier spacing. IEEE 802.11p, which comprises wireless access in vehicular environments (WAVE), is an asynchronous vehicular communication network. The spacing in LTE is approximately 10× smaller than 802.11p (see the below table, exemplary for a 10-MHz carrier).

|  | 802.11P | LTE-V2X REL-14 | 5G |
| --- | --- | --- | --- |
| OFDM subcarrier-spacing | 156.25 kHz | 15 kHz | 15 to 480 kHz ($2^N$ * 15 kHz configurable) |
| Number of subcarders per OFDM symbol | 52 | 600 | 18 to 600 |
| Sensitivity to Doppler & frequency offsets | Low | high | configurable |

The smaller subcarrier spacing for LTE leads to tighter requirements on user synchronization to avoid ISI and ICI.

LTE has small subcarrier spacing (15 kHz) and is more sensitive to frequency offset errors. $f_{D,max}$ is approximately 22% of the 15 kHz subcarrier spacing and large ICI can result.

In 802.11p communication the subcarrier spacing is 156.25 kHz, so even a frequency offset error of $f_{D,max}$ is only approximately 2% of subcarrier spacing. Any resulting ICI should be quite small.

Relatively high frequency offset is not limited to LTE-V2X and can occur in other LTE-based applications such as high-speed-trains & planes, which are also part of the "Co-operative ITS" concept.

Frequency offsets exceeding the 600 Hz oscillator mismatch margin could arise in a range of LTE and non-LTE applications due to a range of other factors including:

The environment;
Loss of GPS; GNSS or base-station synchronization. For example, after a long time in a tunnel or underground parking lot the timing of a local oscillator clock may have drifted significantly;
Lower quality components used in the transmitter/receiver; and
Local oscillators with more drift.

Figure 3:
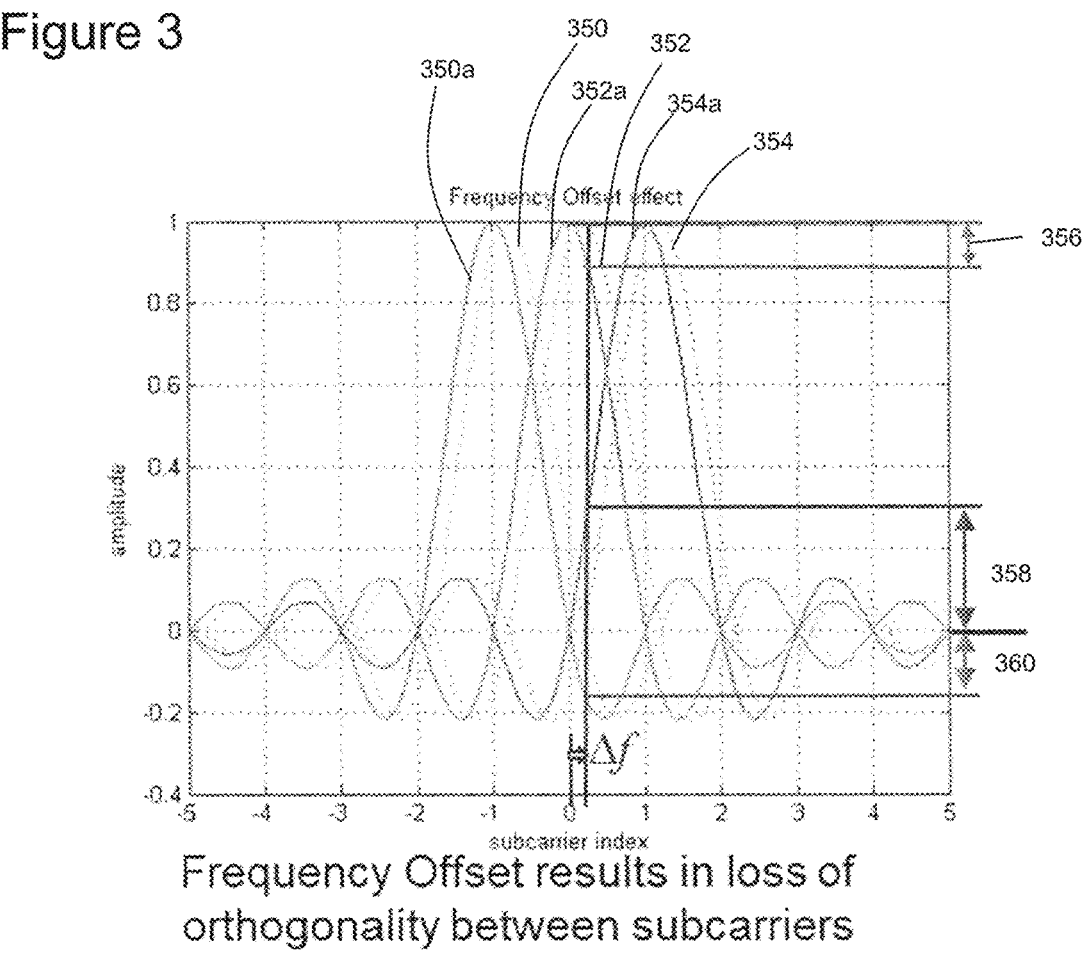
FIG. 3 illustrates possible effects of frequency offset errors on subcarriers, for an OFDM signal.

FIG. 3 illustrates possible effects of frequency offset errors on subcarriers. FIG. 3 shows three nominally orthogonal subcarrier signals 350 352 354. The orthogonality of the subcarriers 350 352 354 can be seen in that a peak of each subcarrier corresponds to a zero for the other two subcarriers.

A frequency offset error, Δf, is illustrated for each signal resulting in offset-subcarrier signals 350a 352a 354a. The subcarrier signals 350 352 354 may represent the timing of the receiver LO, which is used to control the timing at which a received signal is sampled. The offset-subcarrier signals 350a 352a 354a may represent the timing of the (faded) receive signal.

Frequency offsets errors (or frequency errors generally) in the receive signal can degrade signal to interference noise ratio (SINR) in two ways:

Non-ideal sampling of the sinc pulse (not sampled at maximum/signal peak). As shown in the Figure, the receiver samples the offset-subcarrier 352a at a frequency corresponding to the peak of the subcarrier 352. A signal-loss 356 results from the frequency-offset-error Δf.

Inter-carrier-interference (ICI) as adjacent subcarriers are not sampled at zero. The receiver samples the offset-subcarrier 352a at a frequency corresponding to the peak of the subcarrier 352. ICI occurs due to the non-zero values 358 360 of the other two offset-subcarriers 350a 354a at the sampled frequency.

Another way to view the effect of frequency-offset-errors is to look at the spectrum of the transmission and receive signals and observe the amount of energy that leaked to other subcarriers. FIGS. 4a to 4f provide a series of simulation results showing differing frequency offset errors between a transmitter-signal 462 and a receiver-signal 464, for the transmission of synchronization-subframe signals in the central 72 allocated-subcarriers. The transmitter signal 462 may be the output of the subcarrier-mapping block and the receiver signal 464 may be the frequency domain input-signal to the subcarrier-demapping-block. In this way we can compare the effect of the frequency-offset-error on the FFT-grid subcarriers. In other words, we compare the two streams:

"before fading channel"=transmitter side (462)
"after fading channel"=receiver side (464)

The "fading channel" may comprise several signal degrading effects including: propagation path loss (due to distance between transmitter and receiver); reflections of the signal, typically modelled as delays taps; and Doppler shift. The "fading channel" may also comprise RF impairments effects such as time and frequency offsets or sampling error (due to LO mismatches between transmitter and receiver, for example). Additive white Gaussian noise (AWGN) was included in the simulations.

Figure 4A:
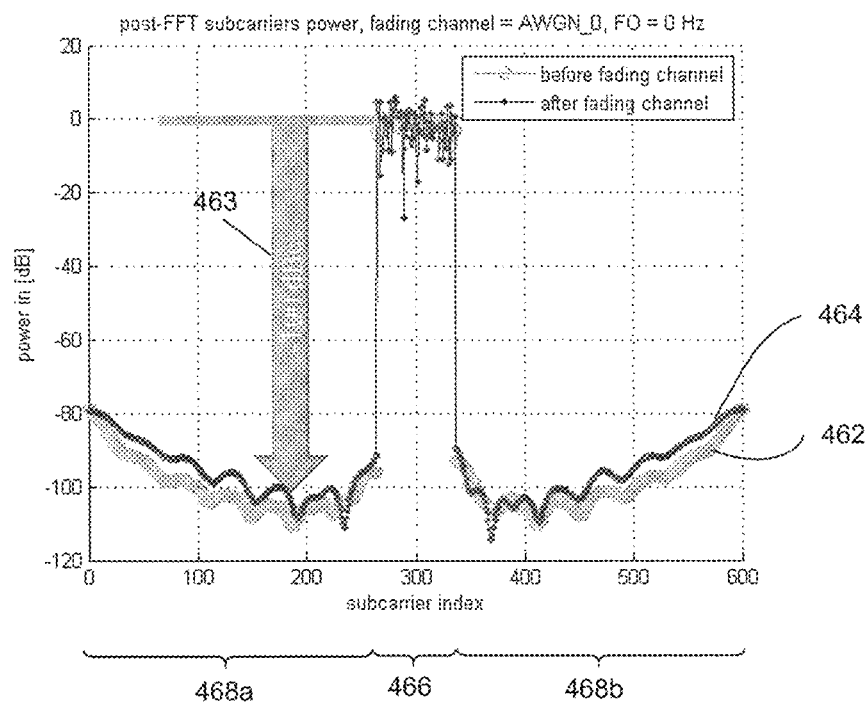

FIG. 4a illustrates the case of zero frequency-offset-error between the transmitter signal 462 and the receiver signal 464 (Frequency Offset=0 Hz). It can be seen that almost all the energy is located in the 72 central allocated-subcarriers 466 in both the transmitter signal 462 and the receiver signal 464. A negligible amount of energy is present on the unallocated-subcarriers 468a 468b. The noise floor 463 is approximately −100 dBc and can be limited by quantization due to non-ideal analogue to digital conversion (ADC), or signal processing operations such as fast Fourier transforms (FFT).

Figure 4B:
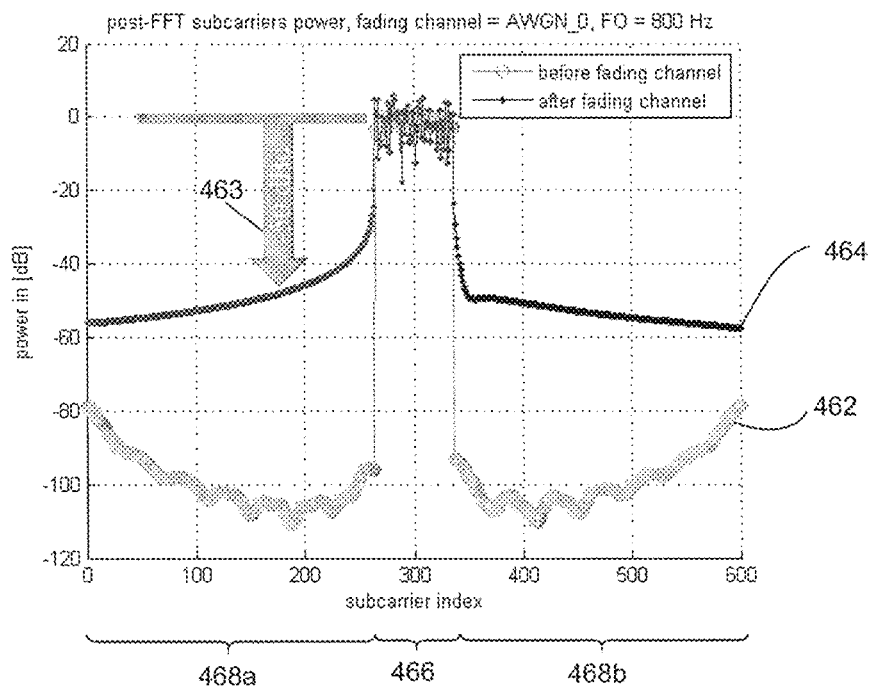

FIG. 4b illustrates the transmitter signal 462 and receiver signal 464 under a moderate frequency offset error (set to 800 Hz in this example). Energy leakage occurs from a subcarrier to other subcarriers. It can be seen that some energy appears in the unallocated-subcarriers 468a 468b of the receiver signal 464. In other words, energy has leaked from the allocated-subcarriers 466 to the unallocated-subcarriers 468a 468b of the receiver signal 464. The noise floor 463 has increased from ~−100 dBc in FIG. 4a to ~−50 dBc.

Figure 4C:
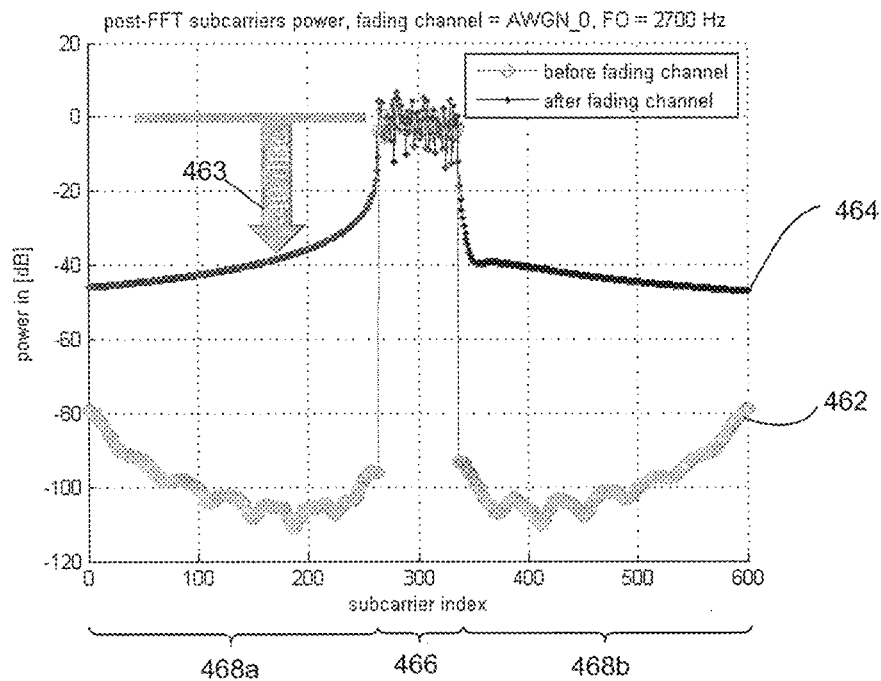
Figure 4D:
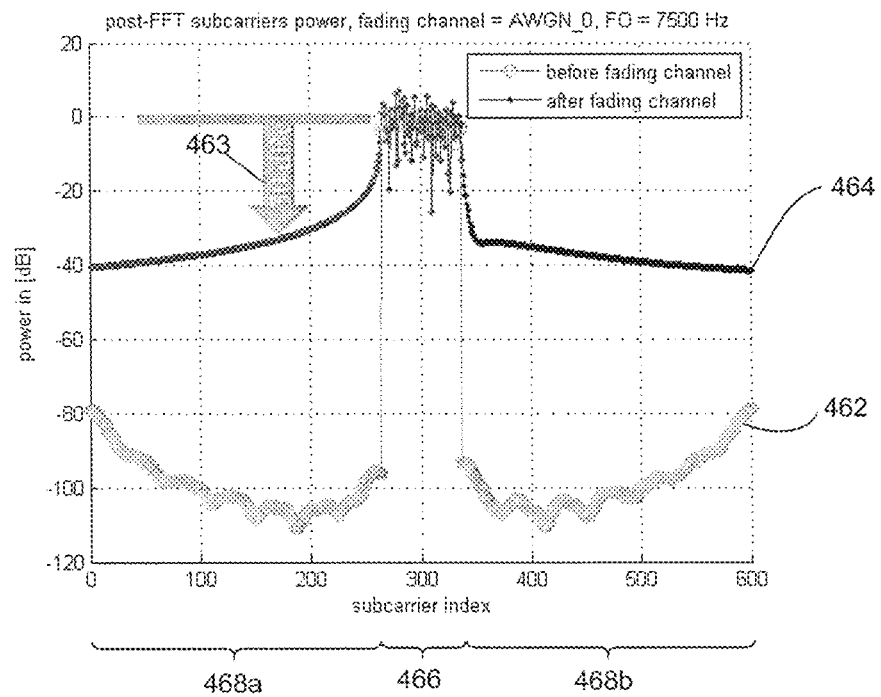

FIGS. 4c and 4d illustrate the same effect as FIG. 4b, but under heavy frequency offset error (set to 2700 Hz and 7500 Hz respectively). The amount of energy leaked from the allocated-subcarriers 466 to unallocated-subcarriers 468a 468b, of the receiver signal, increases with increasing frequency offset error. The noise floor 463 increases to ~−40dBc and ~−30dBc in FIGS. 4c and 4d respectively.

Figure 4E:
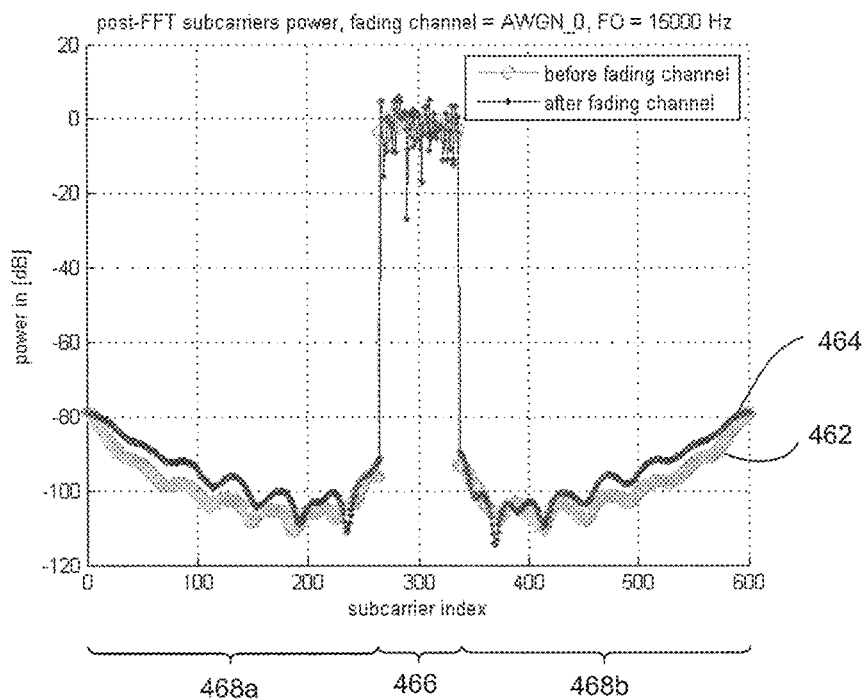

FIG. 4e illustrates the effect of a frequency offset error equal to a multiple of the subcarrier spacing. In this example, the frequency offset error is equal to the subcarrier spacing of 15 kHz. This frequency offset error results in no apparent energy leakage to other subcarriers of the receiver signal 464, but a simple subcarrier index change (x-axis shift by 1). All the subcarriers are exactly shifted by an integer number, and thus the transmitter-signal 462 and receiver signal 464 are effectively aligned again (except that the actual data is not on the expected subcarrier). The shift is difficult to see in the drawing, because it is only 15 kHz=1 subcarrier. FIG. 4e thus resembles FIG. 4a.

Figure 4F:
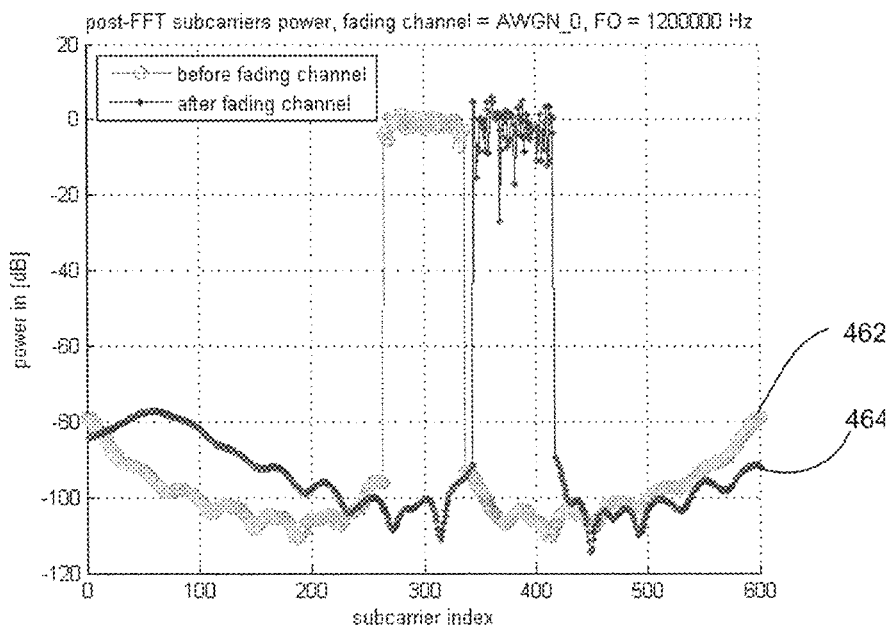

FIG. 4f illustrates a much larger frequency offset error that is a multiple of 15 kHz. The effect is much more visible. The frequency offset error is 80×15 kHz=1.2 MHz, that is 80 multiples of the subcarrier spacing.

As mentioned above in relation to FIG. 2, when the subcarrier-demapping-block receives a synchronisation subframe, it will isolate the 72 central allocated-subcarriers and provide them to the channel-estimate-block and the decoding-block. The unallocated-subcarriers are not processed any further. In this way, the receiver uses the central 72 subcarriers for the decoding process of PSS/SSS, DMRS and BCH.

FIG. 5 illustrates a concept of the present disclosure. In such a concept, a subcarrier-demapping-block will provide both the allocated-subcarriers 566 and the unallocated-subcarriers 568a 568b, of a receiver signal 564, to a channel-estimate-block and a decoding-block.

Even though in Sidelink synchronization subframes there is no data allocated to the neighbouring unallocated-subcarriers, a frequency-offset-correction block can use them to improve the frequency offset robustness of BCH decoding. The reason is that in case of frequency-offset-error, energy leaks onto these unallocated-subcarriers. By including them in a frequency offset correction input, the energy that leaked onto them can advantageously be harvested. As a result, the BCH decoding performance can be improved substantially.

FIG. 6 illustrates a more detailed example schematic of an OFDM receiver similar to that of FIG. 2. Features of FIG. 6 that are also shown in FIG. 2 have been given corresponding reference numbers in the 600 series and will not necessarily be described again here.

As with the receiver of FIG. 2, when the subcarrier-demapping-block 644 of FIG. 6 receives a LTE synchronisation subframe as an input signal (600 subcarriers (600 sbc) corresponding to 10 MHz bandwidth), it will isolate the 72 central allocated-subcarriers (72 sbc) and provide them to the channel-estimate-block 646 and the decoding-block 648. In this way, the subcarrier-demapping-block provides selected-subcarrier-signals 669a. 669b comprising only the allocated-subcarriers (and not the unallocated-subcarriers), to the channel-estimate-block 646 and the decoding-block 648. In this example, the selected-subcarrier-signals comprise a DMRS-selected-subcarrier-signal 669a and a non-DMRS-selected-subcarrier-signal 669b, which represent subcarrier signals at one or more predetermined (different in this example) symbols within a sub-frame as discussed above. The one or more predetermined symbols may be all, or a subset, of the symbols in the sub-frame. The DMRS-selected-subcarrier-signal 669a is provided to the channel-estimate-block 646. The non-DMRS-selected-subcarrier-signal 669b is provided to the decoding-block 648. The DMRS-selected-subcarrier-signal 669a may only include the DMRS OFDM symbols of the allocated-subcarriers. The non-DMRS-selected-subcarrier-signal 669b may only include the non-DMRS symbols of the allocated-subcarriers. The unallocated-subcarriers are not processed any further.

In this example, the channel-estimate-block 646 comprises a frequency-offset-estimation-block FOE 670; a frequency-offset-correction-block FOC 672; a channel-estimator 674; and a noise-estimator 676. The subcarrier-demapping-block 644 provides the DMRS-selected-subcarrier-signal 669a to the FOE 670 and the FOC 672. The FOE 670 determines the frequency offset error $\Delta f$ of the input-signal relative to a local oscillator of the receiver 622, based on an information signal conveyed by the allocated-subcarriers. The FOE 670 can determine $\Delta f$ based on mathematical properties of the information signal (PSS, SSS, DMRS, BCH etc). The FOE 670 outputs a frequency-offset-estimation-signal 671 representative of the frequency-offset-error $\Delta f$.

The FOC 672 receives the DMRS-selected-subcarrier-signal 669a from the subcarrier-demapping-block 644 and the frequency-offset-estimation-signal 671 from the FOE 670. The FOC applies a frequency-correction-algorithm to the allocated-subcarriers based on the frequency-offset-estimation-signal in order to produce a frequency-corrected-signal 673a. The frequency-corrected-signal 673a is the same as the information-signal conveyed by the allocated-subcarriers in the DMRS-selected-subcarrier-signal 669a except that it has been compensated for any frequency-offset-error $\Delta f$.

The FOC 672 can provide the frequency-corrected-signal 673a to a plurality of subsequent signal processing blocks, such as (but not limited to) the channel-estimator 674 and the noise-estimator 676. The channel-estimator 674 provides a channel-estimated-signal to the noise-estimator 676 and the decoding-block 648. The noise-estimator 676 provides a noise-estimated-signal to the decoding-block 648.

The decoding-block 648 can comprise a second-frequency-offset-correction-block (FOC-2) 678, followed by an equalizer EQ, an inverse transform decoder IDFT, log likelihood ratio (LLR) and further bit-level modules such as Turbo decoding. FOC-2 678 receives the non-DMRS-selected-subcarrier-signal 669b and the frequency-offset-estimation-signal 671 from the FOE 670. FOC-2 678 can operate in the same way as the FOC 872 and provide a frequency-corrected-signal 673b to the rest of the decoding block. The frequency-corrected-signal 673b is the same as the information-signal conveyed by the allocated-subcarriers in the DMRS-selected-subcarrier-signal 669b except that it has been compensated for any frequency-offset-error $\Delta f$. The decoding-block 648 further processes the information signal conveyed on the allocated-subcarriers in the non-DMRS-selected-subcarrier-signal 669b in preparation for bit-decoding. In summary, after the subcarrier-demapping-block 644, the receiver 622 uses only the allocated-subcarriers for the decoding process of PSS/SSS, DMRS and BCH.

FIG. 7 illustrates a schematic of a receiver according to an embodiment of the present disclosure. Features of FIG. 7 that are also shown in FIGS. 2 and/or 6 have been given corresponding reference numbers in the 700 series and will not necessarily be described again here.

In this example, the subcarrier-demapping-block 744 provides both the allocated-subcarriers and at least a subset of the unallocated-subcarriers to the FOC 772 and the FOC-2 778. As shown in this example, the subcarrier-demapping-block 744 may provide all the allocated subcarriers and all the unallocated-subcarriers to the FOC 772 and/or the FOC-2 778. In this way, the subcarrier-demapping-block 744 provides extended-subcarrier-signals (600 sbc) 775a, 775b to the FOC 772 and the FOC-2 778, wherein the extended-subcarrier-signals 775a, 775b can include the allocated subcarriers and at least some of the unallocated-subcarriers. The extended-subcarrier-signals in this example include: a DMRS-extended-subcarrier-signal 775a, and a non-DMRS-extended-subcarrier-signal 775b. The DMRS-extended-subcarrier-signal 775a is provided to the FOC 772, and in this example only includes the DMRS OFDM symbols of the allocated-subcarriers. The non-DMRS-extended-subcarrier-signal 775b is provided to the FOC-2 778, and in this example only includes the non-DMRS symbols of the allocated-subcarriers. The FOC function can be dimensioned for the most demanding data subframes, and therefore is likely to be able to receive all the unallocated-subcarriers of the BCH synchronization subframes, without any changes to the FOC function.

The FOC 772 and FOC-2 778 use the unallocated-subcarriers to refine the frequency correction process. In this way, energy that leaked into the unallocated-subcarriers due to frequency offset error can be harvested. Using a FOC function that spans over all subcarriers can harvest all the input signal's energy and particularly improve the quality of the signal, for example the signal to noise ratio (SNR), provided to the Equalizer. This can improve the block error rate (BLER) decoding performance, as will be discussed below.

In this example, the selected-subcarrier-signal (72 sbc) 769 is provided to the FOE 770. That is, only allocated-subcarriers are provided to the FOE 770 which operates in the same manner to the FOE of FIG. 6.

The FOC 772 receives the DMRS-extended-subcarrier-signal 775a from the subcarrier-demapping-block 744. The FOC 772 also receives the frequency-offset-estimation-signal 771 from the FOE 770. The FOC 772 applies a frequency-correction-algorithm to the allocated-subcarriers and at least a subset of the unallocated-subcarriers, based on the frequency-offset-estimation-signal 771 in order to produce a frequency-corrected-signal 773a. The frequency-corrected-signal 773a is the same as the DMRS-extended-subcarrier-signal 775a except that it has been compensated for any frequency-offset-error Δf. As shown in this example, the FOC 772 may also remove the unallocated-subcarriers after applying the frequency-correction-algorithm such that the frequency-corrected-signal 773a only comprises the 72 allocated subcarriers (72 sbc).

FOC-2 778 receives the non-DMRS-extended-subcarrier-signal 775b and the frequency-offset-estimation-signal 771 from the FOE 770. FOC-2 778 can operate in the same way as the FOC 772 and provide a frequency-corrected-signal 773b to the rest of the decoding block. The frequency-corrected-signal 773b is the same as the information-signal conveyed by the allocated-subcarriers in the DMRS-extended-subcarrier-signal 775b except that it has been compensated for any frequency-offset-error Δf. The decoding-block 748 further processes the information signal conveyed on the allocated-subcarriers in the non-DMRS-extended-subcarrier-signal 775b in preparation for bit-decoding. The FOC-2 778 may also remove the unallocated-subcarriers after applying the frequency-correction-algorithm such that the frequency-corrected-signal 773b only comprises the 72 allocated subcarriers (72 sbc).

In the example of FIG. 7, both the FOC 772 and FOC-2 operate in the same way according to an embodiment of the present disclosure. In the example: (i) the FOC 772 receives DMRS symbols in the DMRS-extended-subcarrier-signal 775a; and (ii) the FOC-2 778 receives non-DMRS symbols in the non-DMRS-extended-subcarrier-signal 775b. In both cases, the subcarrier-demapping-block provides the allocated-subcarriers and the unallocated-subcarriers to the frequency-offset-correction-blocks (FOC, FOC-2) 770, 772. Each FOC block applies a frequency-correction-algorithm to the allocated and unallocated subcarriers, based on the frequency-offset-estimation-signal, to produce frequency-corrected-signals which compensate for the frequency-offset-error of the input-signal. In this example, the input-signal is a synchronisation subframe.

Relative to FIG. 6, only the subcarrier-demapping-block 744; the FOC 772 and the FOC-2 778 have changed so that the FOC 772 and FOC-2 778 use more (unallocated) subcarriers as an input. Also, optionally, they drop the extra unallocated-subcarriers at the output.

The remaining stages of the receiver 722 are unchanged relative to the receiver of FIG. 6:
 FFT 742 and cyclic-prefix-receiving-block 740 are unchanged;
 FOE 770 is unchanged; and
 Channel-estimator 774. Equalizer, and channel decoding are unchanged The same signal processing function can be used in the FOC and FOC-2 of the receivers of FIGS. 6 and 7. This signal processing function can be based on a finite impulse response (FIR) filter. An FIR filter can apply coefficients, representing weights (sub-sample delay coefficients), to each subcarrier. If the FIR filter is applied in the frequency domain, an array of coefficients can be used—one set for each subcarrier for a range of frequency-offset-error values.

FIG. 8 illustrates a FOC 880 with an algorithm that applies a FIR filter in the time-domain, as a common optimization technique for large inputs. The FOC 880 receives input data 875 in the form of subcarriers. For the receiver of FIG. 7, the input data 875 can be either of the extended-subcarrier-signals comprising allocated-subcarriers and unallocated-subcarriers. The FOC 880 also receives a frequency-offset-estimation-signal 871 from a FOE (not shown) and provides output data 873, such as a frequency-corrected-signal.

In this example, the FOC 880 comprises a frequency-to-time-domain conversion block 882; a phase-ramp-generator 884; a phase-ramp-multiplier 886; and a time-to-frequency-domain conversion bock 888. In this example, the frequency-to-time-domain conversion block 882 is an inverse-discrete-Fourier-transform (IDFT) and the time-to-frequency-domain conversion block 888 is a discrete Fourier transform (DFT). The IDFT converts the frequency-domain input data 875 to the time domain. The IDFT converts the allocated-subcarriers and unallocated-subcarriers to a time-domain-uncorrected-signal. The phase-ramp-generator 884 generates a phase-ramp-signal based on the frequency-offset-estimation-signal 871. The phase-ramp-multiplier 886 receives the phase-ramp-signal and the time-domain-uncorrected-signal and multiplies the two signals to produce a ramped-time-domain-signal. In this way, an exponential phase rotation is applied to the input-data (subcarriers). The phase-ramp-multiplier 886 provides the resulting ramped-time-domain-signal to the DFT which converts the ramped-time-domain-signal to the frequency-corrected-signal 873.

The effect of the time domain FOC 880 is equivalent to applying a very long spectrum FIR filter to the input data, in the frequency domain. This can be particularly advantageous in the receiver of FIG. 7 in which both the unallocated-subcarriers and the allocated-subcarriers are provided to the FOC and the FOC-2, which can therefore comprise a large input set.

An example extract of Matlab code that can implement the FOC 880 of FIG. 8 is as follows:

```
for sym_idx = 1:N_DMRS_sym
  t_vec_sym =
  2*pi*freq_offset_Hz*([0+initial(sym_idx):UE_ts:UE_ts*(N_sbc-
  1)+initial(sym_idx)]');
  UE_fo = (exp(1i*t_vec_sym));   %-- phase ramp generation
    for rx_idx=1:N_Rx_Antennas
    DMRS_received_ifft =
    ifft(DMRS_received(:,sym_idx,rx_idx));    %-- IDFT
    data_with_phase_ramp = DMRS_received_ifft.*UE_fo;   %--
    Apply phase ramp
    DMRS_received_FOC(:,sym_idx,rx_idx) =
    fft(data_with_phase_ramp);   %-- DFT
    end
  end %for sym_idx
```

Assuming the FOC code runs per OFDM symbol, a (higher level) pseudo-code of the above FOC functionality can be written as:
1. Perform IDFT with transform size N, for the input vector A of size N×1 (one symbol for N subcarriers). Place output in buffer B, also of size N×1.
2. Generate a phase ramp in buffer C, of size N×1, which is initialized at 1 for C(1) (1$^{st}$ value of C) and has a phase increment from C(i) to C(i+1) corresponding to the required frequency offset error Δf.
3. Perform a point by point scalar multiplication between B and C. The product of the operation is placed in D, of size N×1.
4. Perform DFT with transform size N, for the input vector D of size N×1 and place output in buffer E of size N×1.

An example extract of Matlab code that can call the above FOC functionality for either the 'normal' case, corresponding to FIG. 6 or the 'extended allocation' case according to FIG. 7 is as follows:

```
% FOC
switch SL_user_RX.algo.BCH.RSP.FOC_method
  case 'normal'
  %-FOC 72sbc data
  pilots_received_FOC =
  mRSP_FOC(pilots_received,+FOE_Hz,N_FFT);
  case 'extended_allocation'
  %-FOC on extended data set
  temp = mRSP_FOC(pilots_received_extended,+FOE_Hz,N_FFT) ;
  %-Drop the un-necessary output data
  pilots_received_FOC = temp(user_sbc_in_extended,:,:);
  case 'off'
  %-- no FOC
  pilots_received_FOC = pilots_received ;
  otherwise
    error(' ')
end
```

Pseudo-code for operating the FOC function of the channel estimation block of the receiver of FIG. 6 can be written as:

1. Perform cyclic prefix removal, FFT, and guard removal operation. Output is a buffer A(ai,aj), where ai=subcarrier index=[0:599] for LTE 10 MHz and aj=OFDM symbol index=[0:12] for Sidelink subframe.
2. Select the center 72 subcarriers corresponding to the DMRS symbols from A(ai,aj) and put them into a buffer called B(bi,bj), where bi=[0:71] and bj=[0:2].
3. For each DMRS symbol "bj":
   3.1. Call FOC function, with inputs B(bi,bj) and bi=[0:71], and place output in buffer C(ci,cj) with ci=[0:71] and cj=bj.
4. Continue Channel estimation processing from buffers A & C.

Step 2 occurs in the subcarrier-demapping-block and step 3 occurs in the FOC. The same code can be used in the FOC-2.

Pseudo-code for operating the modified FOC function of the channel estimation block of the receiver of FIG. 7 can be written as:
1. Perform cyclic prefix removal, FFT, and guard removal operation. Output is a buffer A(ai,aj), where ai=subcarrier index=[0:599] for LTE 10 MHz and aj=OFDM symbol index=[0:12] for Sidelink subframe.
2. Select all subcarriers, for the DMRS symbols, from A(ai,aj) and put them into a buffer called B1(b1i,b1j), where b1i=[0:599] and b1j=[0:2].
3. For each DMRS symbol "b1j":
   3.1. Call FOC function, with inputs B1(b1i,b1j) and b1i=[0:599], and place output in buffer C1(c1i,c1j) with c1i=[0:599] and c1j=b1j.
   3.2. Select from C1(c1i,c1j) the center 72 subcarriers, and place them in a buffer called C2(c2i,c2j), with c2i=[0:71] & c2j=[0:2]
4. Continue Channel estimation processing from buffers A & C2.

Step 2 occurs in the subcarrier-demapping-block and step 3 occurs in the FOC. The same code can be used in the FOC-2. Although Matlab has been used in the example code extracts, any appropriate coding language may be used in other examples.

The difference between the pseudo-code for operating the receivers of FIGS. 6 and 7 is that all subcarriers are used in calling the FOC for FIG. 7. The unallocated-subcarriers are also dropped at the output. In this example, the difference is in the BCH receiver integration code and not in the low-level signal processing blocks.

FIG. 9 illustrates the performance improvement obtained from the receiver of FIG. 7 relative to the receiver of FIG. 6. The improvement was assessed using a Matlab numerical model of a LTE-V2X BCH chain. Similar results would be expected from simulation results using other numerical software. The transmitter encoding and receiver decoding processing were simulated according to the LTE specifications. Both perfect channel estimate and realistic channel estimate were simulated. Perfect channel estimate is a simulation technique in which the channel-estimate-block is artificially bypassed. That is the output signals of the channel-estimation-block (frequency-offset-estimation-signal, channel-estimated-signal and noise-estimated-signal), are simulated as the exact fading channel and noise characteristics, which are known in the simulation environment (not possible in real-life). Perfect channel estimate simulations can be used to derive the upper bounds of the decoding performance and may theoretically represent the best performance that a receiver can achieve. Realistic channel estimate simulations model the case where the channel-estimate-block is used by the receiver. Realistic channel estimate simulations can represent the actual performance of a receiver, for a specific signal processing path.

A useful performance metric is the block error rate (BLER). The improvement for a specific performance point, such as 1% or 10% BLER, can be measured.

FIG. 9 shows an example BLER simulation plot for a frequency-offset-error of 7.5 kHz. The lower graph 992 is an expanded view of the highlighted area 994 of the upper graph 990. The graphs 990 992 plot BLER against signal to noise ratio (SNR) of the receive-signal for: (i) simulated perfect channel estimate using 72 allocated-subcarriers in the receiver of FIG. 6 (plot 996); (ii) simulated perfect channel estimate using 72 allocated-subcarriers and 528 unallocated-subcarriers in the receiver of FIG. 7 (plot 998); simulated real channel estimate using 72 allocated-subcarriers in the receiver of FIG. 6 (plot 991); and simulated real channel estimate using 72 allocated-subcarriers and 528 unallocated-subcarriers in the receiver of FIG. 7 (plot 993).

An advantage of the improvement seen in FIG. 9 is that the receiver of FIG. 7, by utilising all 600 subcarriers, can process receive-signals with a lower SNR to provide the same BLER, compared to the receiver of FIG. 6 which only utilises the 72 allocated-subcarriers.

The performance improvement arises from:
1. Improved channel estimate (one FOC is performed before the Channel Estimator, typically on DMRS symbols)
2. Improved (cleaner) data symbols (FOC-2 is performed before Equalization)

The performance improvement can depend on a large panel of parameters, including modulation and coding scheme (MCS), fading channel and number of antennas, among others.

The receiver of FIG. 7 which performs frequency-offset-error correction based on both the allocated-subcarriers and the unallocated-subcarriers can be useful in a range of applications including:

LTE-V2X BCH at 5.9 GHz carrier frequency, for deployments that might induce large frequency offset, such as high-speed scenarios such as highway, high-speed train etc;

For different LTE-V2X carrier frequency deployments (different than 5.9 GHz), where smaller frequency offsets may be proportionally more problematic, for example milli-meter waves;

For other OFDM-based standards, such as 5G where the subcarrier spacing can also be configured to be small; and LTE-V2X data subframes (PSSCH & PSCCH), when the allocated-subcarriers for different user-node are not contiguous to one another.

For the latter, if a unique user is transmitting in a given LTE-V2X subframe, it may be possible to re-use the same approach, described in relation to FIG. 7, to enhance the decoding performance of the data-subframe channels PSCCH & PSSCH.

FIG. 10 illustrates an example Sidelink data-subframe in which only a single user is utilising the available bandwidth, that is only a single user is transmitting a signal. The illustration is similar to FIG. 1 which illustrates a synchronization subframe. The data-subframe comprises allocated-subcarriers 1110 that convey the data payload of the user, and unallocated-subcarriers that can be considered unused.

The receiver of FIG. 7 can use the same approach described above to process the data-subframe 1100. That is, the subcarrier-demapping-block can determine the allocated-subcarriers 1110 and the unallocated-subcarriers 1112 from a received input-signal (the data-subframe). For a data subframe, the subcarrier-demapping-block can scan and read the PSCCH first to identify the location of the associated PSSCH data in the data subframe. That is the subcarrier-demapping block determines the allocated-subcarriers 1110 that have been allocated to convey the PSSCH signal.

Once determined, the subcarrier-demapping-block can provide both the allocated-subcarriers 1110 and at least a subset of the unallocated-subcarriers 1112 to the FOC and the FOC-2. The FOC and FOC-2 can apply an algorithm to the allocated-subcarriers 1110 and the unallocated-subcarriers 1112, based on the frequency-offset-estimation-signal to provide a frequency-corrected-signal. The frequency-corrected-signal can then be used for channel estimate, equalization and bit decoding. A similar performance improvement to that observed in FIG. 9 in relation to synchronization subframes can be achieved for the data subframe 1110. The FOC in the channel-estimate-block can receive a DMRS-extended-subcarrier signal and the FOC-2 in the decoding-block can receive a non-DMRS-extended-subcarrier-signal, in the same way as that described above in relation to FIG. 7.

One example, among others, of a single user case could be a conjunction of a non-dense environment and high-speed travel. For example, a motorway at night, or a rural/countryside road.

A further embodiment of the disclosure is a system comprising a receiver similar to that of FIG. 7 used in conjunction with a plurality of antennas. The multiple-antenna-receiver may comprise separate cyclic-prefix-receiving-blocks; FFT-blocks: subcarrier-demapping-blocks; FOE; and FOC for each antenna, but otherwise use common processing blocks for channel-estimate, equalization and bit decoding. For example, some vehicle communication systems can comprise a transceiver system with two antennas, one in each wing mirror. Implementing separate FOC algorithms, on allocated and unallocated subcarriers, for each antenna can reduce the requirement for expensive cabling between the antennas that is typically required to ensure timing and synchronization.

The following are advantages of the receiver of FIG. 7:
Improvement of LTE-V2X PSBCH channel decoding, particularly for high frequency offset errors;
Capability to cover new and higher-speed use cases (such as trains/planes);
Easy implementation (no extra hardware or software block is needed relative to the receiver of FIG. 6). The only modifications may be to enable the provision of unallocated-subcarriers to the FOC and FOC-2.

The disclosed systems can also be used in other OFDM-based standards, such as 5G. Additionally, other applications can suffer a degradation in performance due to frequency-offset-error in less or more pronounced ways (due to higher MCS, finer subcarrier spacing and/or higher doppler shifts, among other factors), and their performance can also be improved by the systems disclosed herein.

In some embodiments, a system may only comprise a single FOC block for use with both channel estimation and decoding.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A system for use with an OFDM-receiver, the system comprising:
    a frequency-offset-correction-block; and
    a sub-band-demapping-block configured to:
        receive an input-signal and determine within the input signal:
            one or more allocated-frequency-sub-bands allocated to convey an information-signal; and
            one or more unallocated-frequency-sub-bands; and
        provide the allocated-frequency-sub-bands and the unallocated-frequency-sub-bands to the frequency-offset-correction-block;
    wherein the frequency-offset-correction-block is configured to:
        receive a frequency-offset-estimation-signal representative of a frequency-offset-error of the input-signal relative to a local oscillator of the OFDM-receiver; and
        apply a frequency-correction-algorithm to the allocated-frequency-sub-bands and at least a subset of the unallocated-frequency-sub-bands, based on the frequency-offset-estimation-signal, to produce a frequency-corrected-signal which compensates for the frequency-offset-error of the input-signal.

2. The system of claim 1 wherein the sub-band-demapping-block is further configured to provide the allocated-frequency-sub-bands to a frequency-offset-estimation-block, and wherein the frequency-offset-estimation-block is configured to determine the frequency-offset-estimation-signal based on the allocated-frequency-sub-bands.

3. The system of claim 1 wherein the sub-band-demapping-block is configured to determine a frequency-sub-band in the input-signal as either an allocated-frequency-sub-band or an unallocated-frequency-sub-band based on a communications standard.

4. The system of claim 1 wherein the allocated-frequency-sub-bands are allocated to convey data subframes or synchronization subframes.

5. The system of claim 1 wherein the allocated-frequency-sub-bands comprise a range of frequency-sub-bands positioned in the centre of a total frequency bandwidth available.

6. The system of claim 1 wherein the frequency-offset-correction-block is further configured to remove the unallocated-frequency-sub-bands before providing the frequency-corrected-signal.

7. The system of claim 1 wherein the frequency-offset-correction-block is configured to produce the frequency-corrected-signal using all subcarriers of the input-signal.

8. The system of claim 1, wherein:
    the sub-band-demapping-block is configured to:
        generate an extended-subcarrier-signal based on the input signal, wherein the extended-subcarrier-signal comprises, for one or more predetermined symbols within a sub-frame of the input signal: (i) the one or more allocated-frequency-sub-bands; and (ii) the one or more unallocated-frequency-sub-bands; and
        provide the extended-subcarrier-signal to the frequency-offset-correction-block;
    and
    the frequency-offset-correction-block is configured to:
        apply the frequency-correction-algorithm to the extended-subcarrier-signal based on the frequency-offset-estimation-signal.

9. The system of claim 1 wherein the frequency-offset-correction-block comprises a finite impulse response filter configured to perform frequency-offset-correction on the input signal.

10. The system of claim 1 wherein the frequency-offset-correction-block comprises:
    a frequency-to-time-domain conversion block configured to convert the allocated-frequency-sub-bands and unallocated-frequency-sub-bands to a time-domain-uncorrected-signal;
    a phase-ramp-generator configured to generate a phase-ramp-signal based on the frequency-offset-estimation-signal;

a phase-ramp-multiplier configured to receive the phase-ramp-signal and the time-domain-uncorrected-signal and multiplies the two signals to produce a ramped-time-domain-signal; and a time-to-frequency-domain conversion block to convert the ramped-time-domain-signal to the frequency-corrected-signal.

11. The system of claim 1 comprising a second frequency-offset-correction-block configured to operate in the same manner as the frequency-offset-correction-block, wherein the frequency-offset-block is configured for use in a channel-estimate-block and the second frequency-offset-block is configured for use in a decoding-block.

12. The system of claim 1 for use with any of:
a LTE OFDM receiver;
a LTE SC-FDMA receiver;
a LTE-V2X SC-FDMA receiver;
a 5G OFDM receiver;
a 5G SC-FDMA receiver; or
any other OFDM, OFDMA or SC-FDMA receiver.

13. The system of claim 1 wherein the OFDM receiver is a LTE OFDM receiver or LTE SC-FDMA and the 72 central frequency-sub-bands are allocated-frequency-sub-bands allocated to convey a synchronization subframe.

14. A receiver comprising:
a frequency-offset-correction-block; and
a sub-band-demapping-block configured to:
receive an input-signal and determine within the input signal:
one or more allocated-frequency-sub-bands allocated to convey an information-signal; and
one or more unallocated-frequency-sub-bands; and
provide the allocated-frequency-sub-bands and the unallocated-frequency-sub-bands to the frequency-offset-correction-block;
wherein the frequency-offset-correction-block is configured to:
receive a frequency-offset-estimation-signal representative of a frequency-offset-error of the input-signal relative to a local oscillator of the receiver; and
apply a frequency-correction-algorithm to the allocated-frequency-sub-bands and at least a subset of the unallocated-frequency-sub-bands, based on the frequency-offset-estimation-signal, to produce a frequency-corrected-signal which compensates for the frequency-offset-error of the input-signal.

15. A method for producing a frequency-corrected-signal for an OFDM-receiver comprising the steps of:
receiving, by way of a sub-band-demapping-block, an input-signal and determining within the input signal by way of the sub-band-demapping-block:
one or more allocated-frequency-sub-bands allocated to convey an information-signal; and
one or more unallocated-frequency-sub-bands;
receiving, by way of a frequency-offset-correction-block, a frequency-offset-estimation-signal representative of a frequency-offset-error of the input-signal relative to a local oscillator of the OFDM-receiver;
applying, by way of the frequency-offset-correction-block, a frequency-correction-algorithm to the allocated-frequency-sub-bands and at least a subset of the unallocated-frequency-sub-bands, based on the frequency-offset-estimation-signal, to produce the frequency-corrected-signal.

16. The method of claim 15, further comprising:
providing the allocated-frequency-sub-bands to a frequency-offset-estimation-block, and
determining, by way of the frequency-offset-estimation-block, the frequency-offset-estimation-signal based on the allocated-frequency-sub-bands.

17. The method of claim 15, further comprising determining, by way of the sub-band-demapping-block, a frequency-sub-band in the input-signal as either an allocated-frequency-sub-band or an unallocated-frequency-sub-band based on a communications standard.

18. The method of claim 15, further comprising removing, by way of the frequency-offset-correction-block, the unallocated-frequency-sub-bands before providing the frequency-corrected-signal.

19. The method of claim 15, further comprising generating, by way of the sub-band-demapping-block, an extended-subcarrier-signal based on the input signal, wherein the extended-subcarrier-signal comprises, for one or more predetermined symbols within a sub-frame of the input signal:
(i) the one or more allocated-frequency-sub-bands; and
(ii) the one or more unallocated-frequency-sub-bands.

20. The method of claim 19, further comprising applying the frequency-correction-algorithm to the extended-subcarrier-signal based on the frequency-offset-estimation-signal.

* * * * *